(12) United States Patent
Veile et al.

(10) Patent No.: US 7,677,384 B2
(45) Date of Patent: Mar. 16, 2010

(54) APPARATUS FOR TRANSPORTING CONTAINERS TO AT LEAST ONE PROCESSING STATION

(75) Inventors: Josef Veile, Westhausen (DE); Rupert Miksch, Satteldorf (DE)

(73) Assignee: Groninger & Co. GmbH, Crailsheim (DE)

( * ) Notice: Subject to any disclaimer, the term of this patent is extended or adjusted under 35 U.S.C. 154(b) by 266 days.

(21) Appl. No.: 11/831,120

(22) Filed: Jul. 31, 2007

(65) Prior Publication Data
US 2008/0289931 A1    Nov. 27, 2008

(30) Foreign Application Priority Data
May 25, 2007   (DE) .................. 10 2007 024 446

(51) Int. Cl.
*B65G 29/00* (2006.01)
(52) U.S. Cl. ................... 198/465.2; 198/795
(58) Field of Classification Search .......... 198/465.1, 198/465.2, 465.3, 795, 580
See application file for complete search history.

(56) References Cited

U.S. PATENT DOCUMENTS

| | | | | |
|---|---|---|---|---|
| 2,334,511 A | * | 11/1943 | Seubert | 198/795 |
| 2,893,538 A | * | 7/1959 | Buttironi et al. | 198/795 |
| 3,630,502 A | * | 12/1971 | Schmidt | 198/465.1 |
| 4,619,205 A | * | 10/1986 | Sticht | 198/465.2 |
| 4,667,804 A | * | 5/1987 | Dubuit et al. | 198/345.3 |
| 5,582,220 A | | 12/1996 | Schott | |
| 6,269,942 B1 | * | 8/2001 | Mader et al. | 198/795 |
| 6,293,387 B1 | * | 9/2001 | Forster | 198/795 |

FOREIGN PATENT DOCUMENTS

EP    0 679 136    11/1995

* cited by examiner

*Primary Examiner*—James R Bidwell
(74) *Attorney, Agent, or Firm*—Michael J. Striker (57) ABSTRACT

An apparatus for transporting containers to at least one processing station, in particular a filling and/or sealing station, having a number of container carriers that accommodate the containers and having two parallel guides spaced apart from each other and extending in the transverse direction, which are used for the advance and return of the container carriers and have turnaround devices at their ends that perform the function of switching the container carriers from one guide into the other guide; pinions are also provided for transporting the container carriers and are situated between the guides and engage the container carriers. The turnaround devices each have arc guides that adjoin the ends of the two guides and are connected to them and that also transition in the arc from one guide to the other guide.

49 Claims, 6 Drawing Sheets

APPARATUS FOR TRANSPORTING CONTAINERS TO AT LEAST ONE PROCESSING STATION

CROSS-REFERENCE TO A RELATED APPLICATION

The invention described and claimed hereinbelow is also described in German Patent Application DE 10 2007 024 446.2 filed on May 25, 2007. This German Patent Application, whose subject matter is incorporated here by reference, provides the basis for a claim of priority of invention under 35 U.S.C. 119(a)-(d).

BACKGROUND OF THE INVENTION

The invention relates to an apparatus for transporting containers to at least one processing station.

In a known apparatus of this kind (EP 0 679 136 A1), two parallel guide rails are provided for the advance and return of the container carriers, which are arranged in a horizontal plane. The turnaround devices are provided with rail sections, which adjoin the guide rails and can pivot around an axis extending perpendicular to the advance direction of the container carriers. An embodiment of this kind is already disadvantageous merely due to the fact that it is not possible to transport the containers in a continuous fashion and as a result, they can only be transported in an intermittent fashion. Such an apparatus also has disadvantages with regard to a desired removability with a possibility for cleaning and sterilization of individual components.

There are also known apparatuses for transporting containers in which revolving, endless chains or belts are used, which have individual container carriers fastened to them. Such revolving chains or belts are not only complex but also disadvantageous to the extent that they permit hardly any removability of individual components and present difficulties with regard to cleaning.

SUMMARY OF THE INVENTION

The object underlying the present invention is to create an apparatus for transporting containers of the type mentioned at the beginning that is simple in design, permits a continuous transport of containers, and fulfills the requirement that the container carriers and other individual components of the apparatus be easy to remove for purposes of cleaning, sterilization, replacement, or the like.

Other defining characteristics of the invention and advantageous embodiments ensue from the dependent claims. The apparatus is simple in design and enables a continuous transport of all kinds of containers. The apparatus permits a laminar flow and favorable gas penetration, which is particularly advantageous in a gas sterilization in the installed position. The individual container carriers are lightweight, easy to detach, and can be replaced with those of a different type in order to adapt to different containers. Individual elements of the apparatus can be quickly and easily detached for purposes of cleaning, sterilization, or the like. It is also advantageous that at the end of the linear guides, the apparatus permits an arc-shaped flow from one guide into the other, which, in spite of the change of direction, occurs in a smooth, zero-impact fashion. This is achieved in a simple fashion by means of the arc guides at the ends of the linear guides, which are equipped with sliding guidance or preferably with rolling guidance.

Other details and advantages of the invention ensue from the description below.

The full wording of the claims is not given above simply to avoid unnecessary repetition, but is instead included herein by reference merely by being touched upon. All of these claimed characteristics, however, are at this point held to have been expressly disclosed and essential to the invention. All characteristics mentioned above and in the description below, as well as those characteristics that can be inferred from the drawings alone, are thus further components of the invention, even if they have not been expressly developed and in particular, are not mentioned in the claims.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The drawings show an apparatus 10 that is used to transport containers, not shown, of virtually any kind. These containers can include, for example, syringes, ampules, vials, and flasks for medicines or the like, which are securely accommodated in container carriers 11. In order to adapt to different kinds of containers, the container carriers 11 can be quickly and easily be replaced with other container carriers.

The container carriers 11 according to the exemplary embodiment shown have a front side 12 and, in the upper region of this, have open recesses 13 arranged along a for example linear row and open toward the same respective side, which are spaced the same distance apart from one another in sequence and are embodied to accommodate corresponding regions of containers that are adapted to the recesses 13. Depending on the specific application and design of containers, the recesses 13 can be used for clamped, standing, or hanging transport of the containers, which are suitably prevented as needed from falling out of the recesses 13.

The apparatus 10 is embodied for continuous and, in a modified form possibly also intermittent, transport of the containers situated in individual container carriers 11 to processing stations, not shown in detail, in particular filling and/or sealing stations, and has two parallel guides 14, 15 spaced apart from each other and extending in the transverse direction, which are used for the guided advance according to arrow 16 and return according to arrow 17. At both ends—to the left and right in FIG. 1, the guides 14, 15 have turnaround devices 18 and 19. The turnaround device on the left in FIG. 1 serves to switch the container carriers 11 from the guide 14 into the other guide 15 and the other turnaround device on the right in FIG. 1 serves to switch the container carriers 11 in the opposite fashion from the guide 15 into the guide 14. The container carriers 11 are transported by means, for example, of pinions 20, 21 that are situated between the guides 14 and 15 and act on the container carriers 11, which pinions are embodied in the form of gears, for example, and engage with the container carriers 11 for the transport.

The guides 14 and 15 and the turnaround devices 18, 19 at the ends extend essentially within a shared horizontal plane; the container carriers 11 extend approximately vertically in relation to this during transport.

The two turnaround devices 18, 19 have respective arc guides 22 and 23, which adjoin the ends of the guides 14, 15 and, for example, are detachably connected to them and in the respective arcs indicated by arrows 24, 25, transition from one guide 14 to the other guide 15 and back again.

Figure 3:
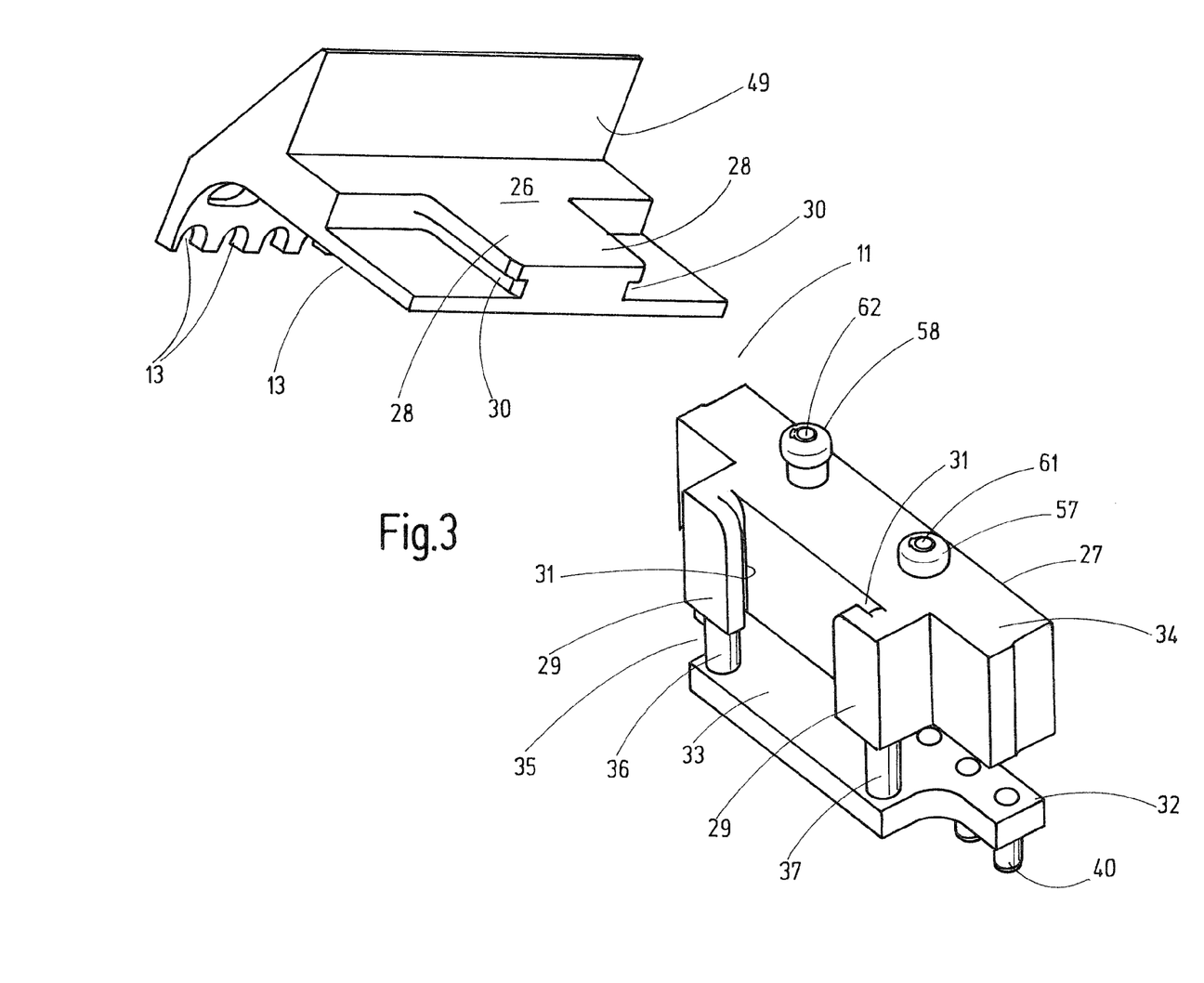
FIG. 3 is a schematic, perspective, exploded view of a container carrier.
Figures 4, 5, 6, 7:
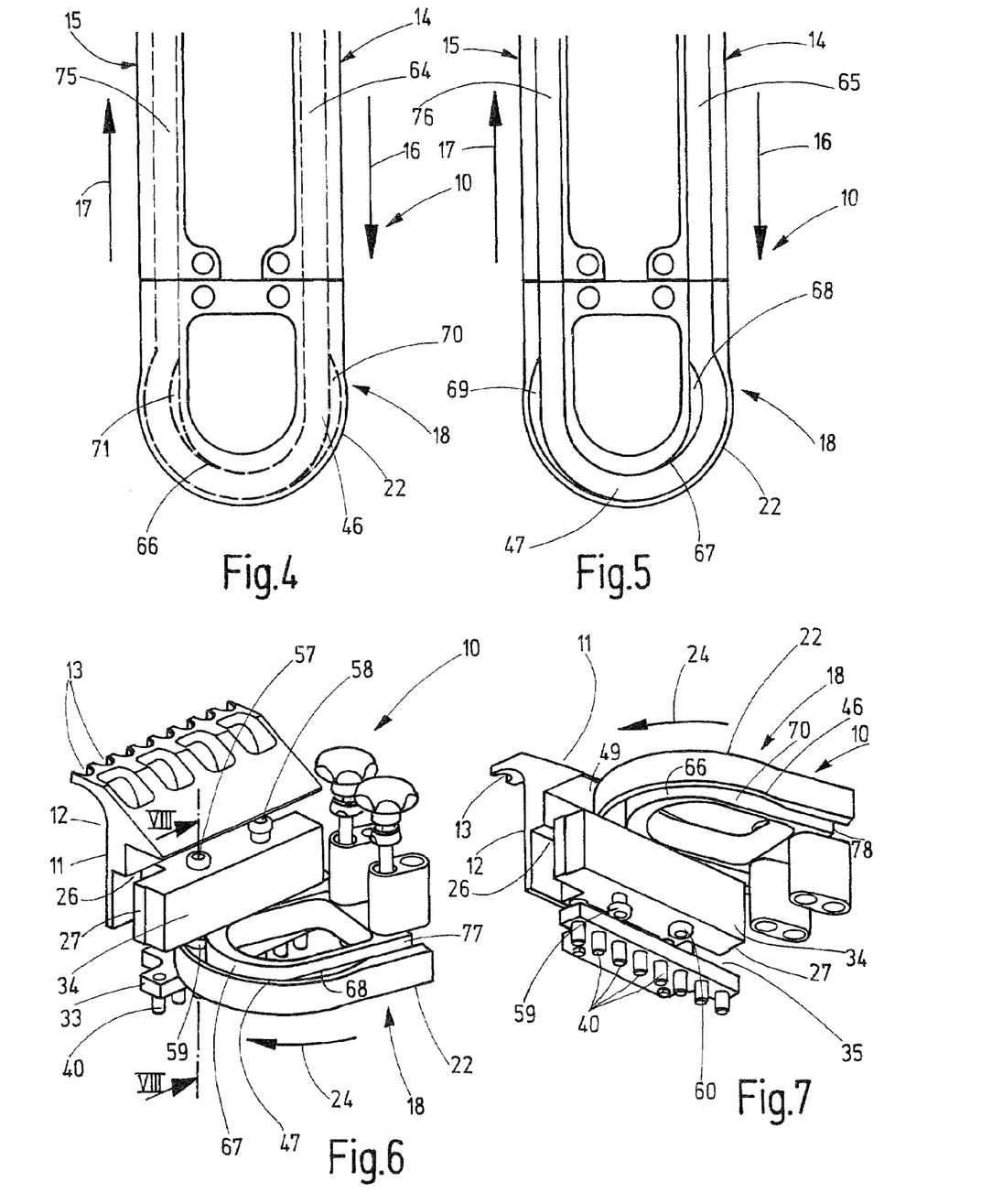
FIG. 4 is a schematic top view of the apparatus from FIG. 1, in its end region on the left in FIG. 1, viewed from above, with an upper guide depicted with dashed lines.
FIG. 5 is a view that approximately corresponds to the one in FIG. 4 of the lower guide.
FIG. 6 is a perspective view of a part of the left end of the lower guide shown in FIG. 4, with a container carrier.
FIG. 7 is a schematic, perspective view of the end of the upper guide on the left in FIG. 1, with a container carrier.
Figure 8:
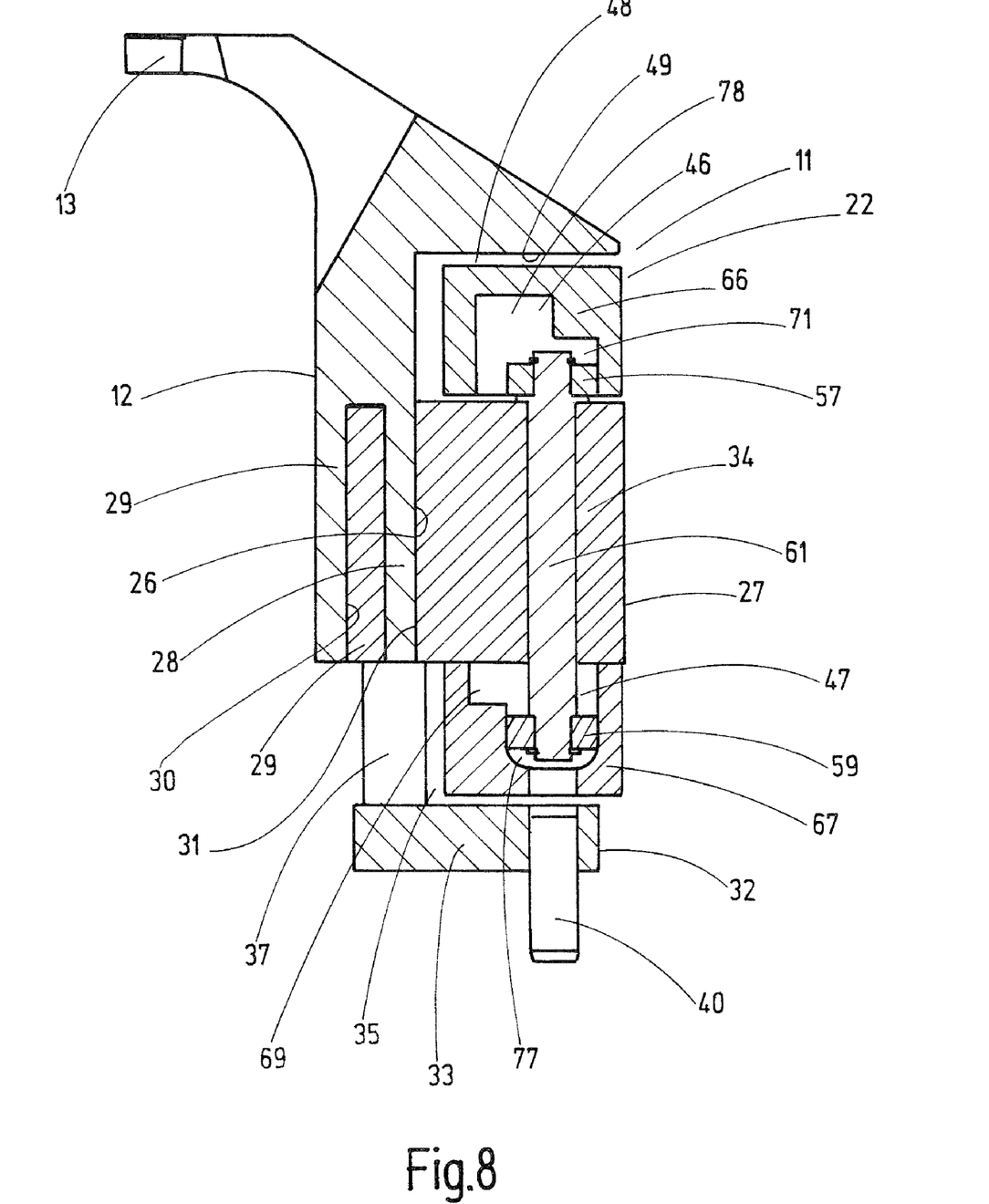
FIG. 8 is a schematic section along the line VIII-VIII in FIG. 6.
Figure 9:
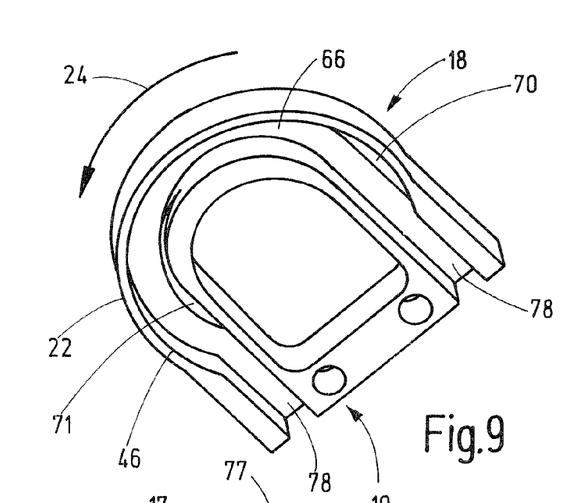
FIG. 9 is a schematic, perspective depiction of the upper guide in the arc region, viewed from below.
Figure 10:
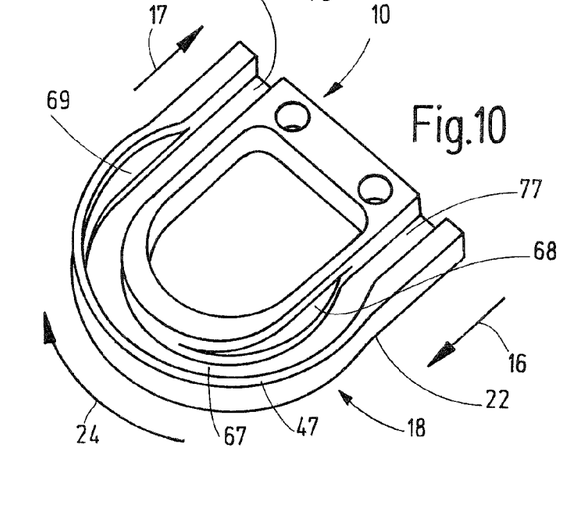
FIG. 10 is a schematic, perspective view of the lower guide in the arc region.
Figure 11:
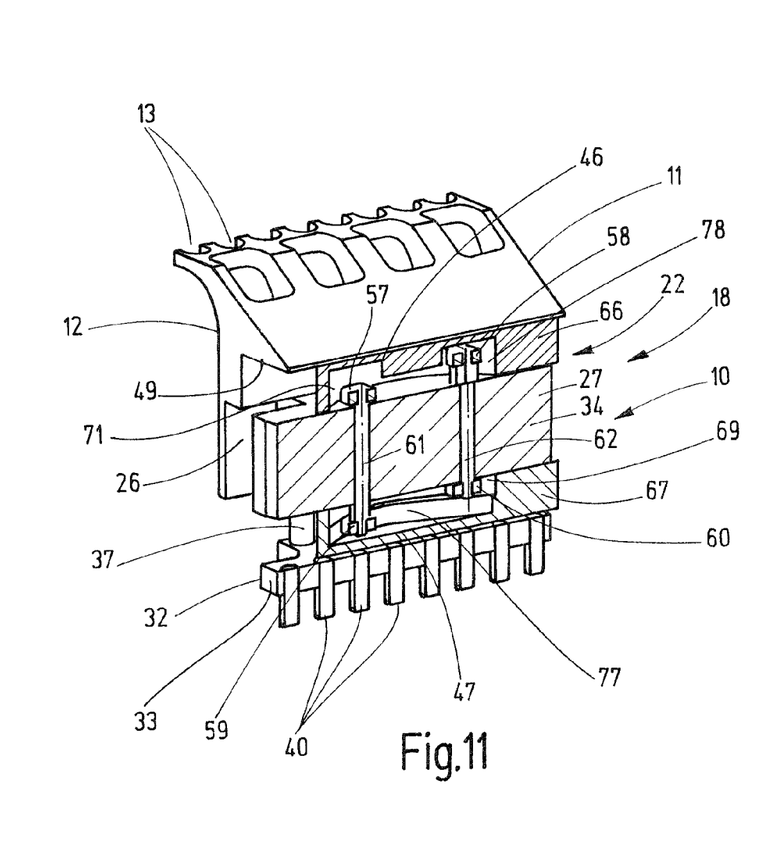
FIG. 11 is a schematic, perspective, partially sectional view of the upper and lower guides, with a container carrier in the arc region.

On their rear side 26 oriented toward the guide 14, 15, the individual container carriers 11 have carrying elements 27 to which they are detachably connected. To produce this connection, rear attaching means between the carrying elements 27 and the container carriers 11 are provided, which can cooperate to form a detachable connection and are comprised, for example, of tongues 28, 29 and grooves 30, 31 for the insertion and accommodation of the tongues 28, 29, as is particularly clear from FIG. 3 and FIG. 8.

In this way, a vertically acting slide connection is produced between each container carrier 11 and carrying element 27, which, when necessary, permits a quick detachment of the container carrier 11 from its carrying element 27 for purposes of cleaning, sterilization, replacement, or the like. Each carrying element 27 also has a lower part 32 in the form of a plate 33, which is held spaced apart from and beneath the upper element part 34 of the carrying element 27, leaving an intermediate space 35 between these two elements. The plate 33 is connected to the upper element part 34 by means of at least one column; in the exemplary embodiment shown, this is accomplished by means of two columns 36, 37 spaced apart from each other.

Figure 2:
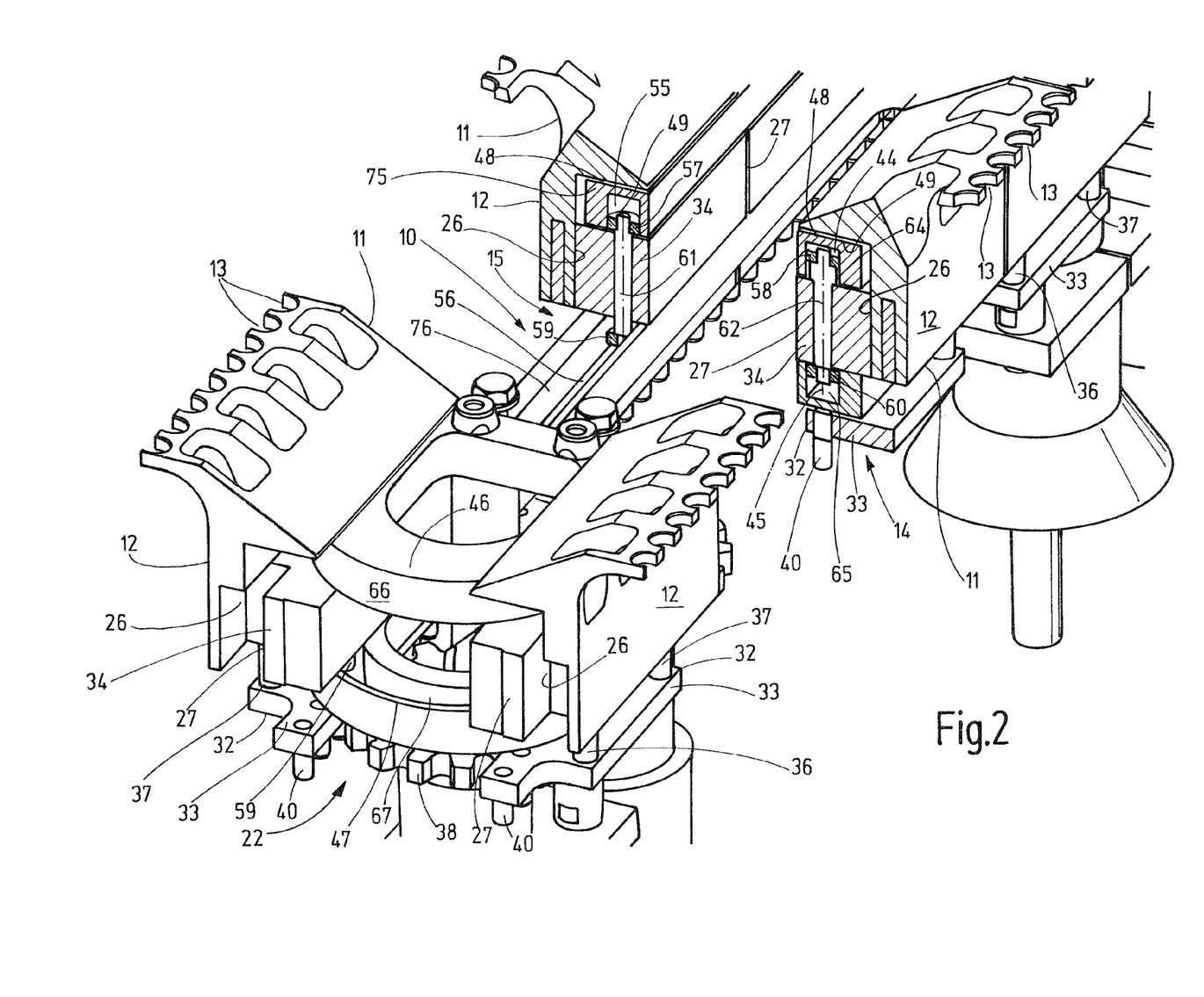
FIG. 2 is an enlarged schematic, perspective, partially sectional view of the apparatus from FIG. 1, in its end region on the left in FIG. 1.

As is particularly clear in FIG. 2, each guide 14, 15 has an upper guide track 44, 55 and, spaced vertically apart from and beneath this, a lower guide track 45, 56, which extends parallel to the associated upper guide track 44, 55. The container carriers 11 are secured, respectively between the upper guide track 44 and the lower guide track 45 of the guide 14 and between the upper guide track 55 and the lower guide track 56 of the guide 15, by means of carrying elements 27, which guide them during transport.

An upper arc track 46 adjoins the ends of the two upper guide tracks 44 and 55. A lower arc track 47 adjoins the ends of the two lower guide tracks 45, 56. The two arc tracks 46, 47 extend over approximately 180° and are embodied for a 180° arc guidance of a part of a respective carrying element 27 that engages the upper guide track 44, 55 and the lower guide track 45, 56. The arc guide 23 shown on the right in FIG. 1 is also embodied in the same way.

The upper arc track 46 and/or the upper guide track 44, 55 can have an upper, approximately horizontal support surface 48 on which the container carriers 11 can be supported in the vertical direction. In lieu of this, the container carriers 11 can also extend spaced vertically apart from this support surface 48, as shown solely by way of example in FIG. 8. If the support surface 48 is to be used for vertical support, then there is no intermediate space between the underside 49 of the container carrier 11 and the support surface 48.

As is particularly clear from FIGS. 6, 7, 9, and 10, the upper arc track 46 and a lower arc track 47 are each embodied as at least approximately the shape of a section of a circle. The centers of the circles of the upper arc track 46 and lower arc track 47 can in this case be approximately aligned, for example vertically.

Figure 1:
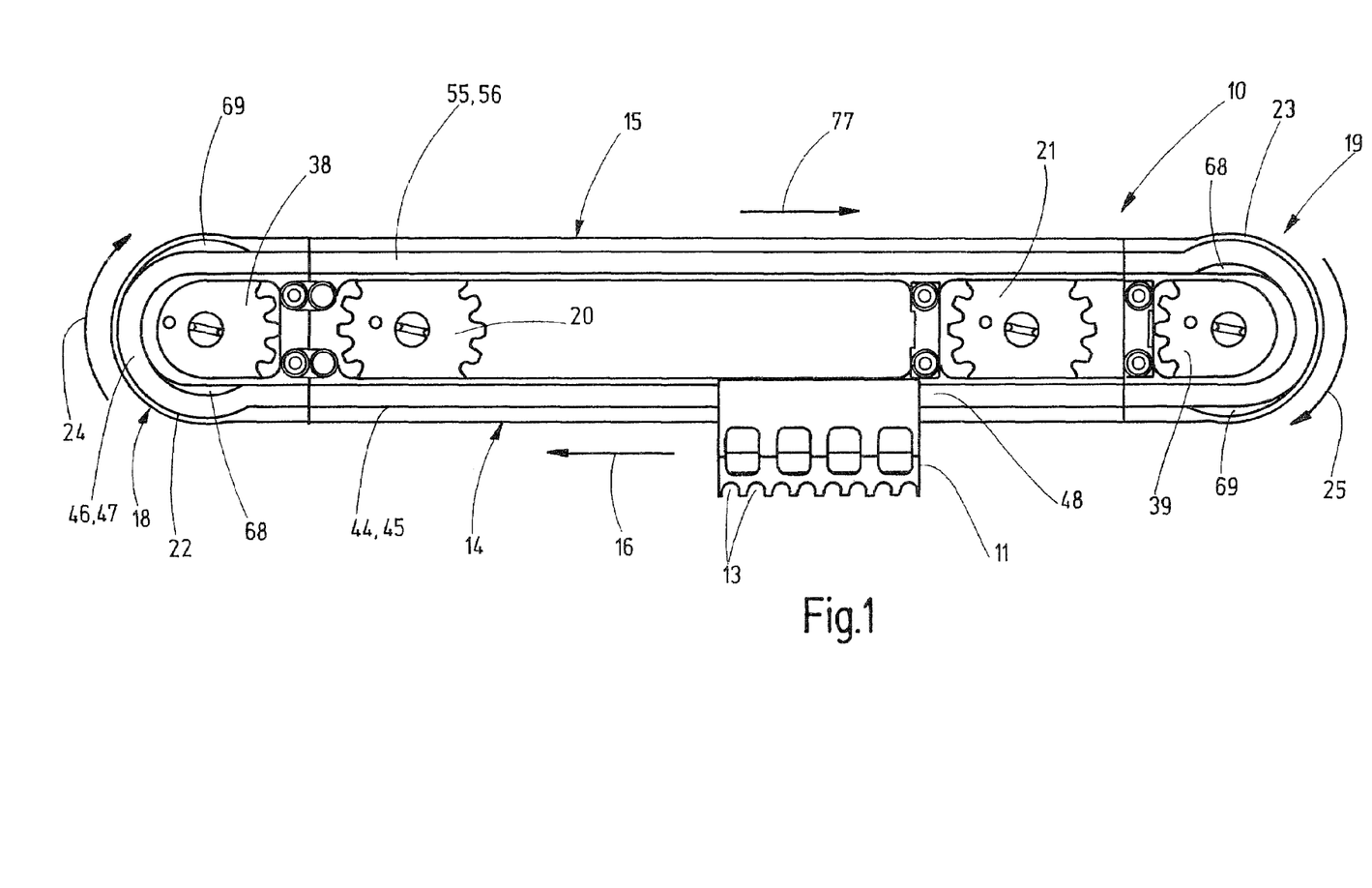
FIG. 1 is a schematic top view of an apparatus for transporting containers; for the sake of clarity, only one container carrier is shown.

According to FIG. 1, a pinion 38, 39 is also situated in the region of the arc guide 22, 23 provided at each of the ends; the rotation axis of the pinion 38, 39 can be vertically aligned at least approximately with the centers of the circles of the upper arc track 46 and lower arc track 47. The arrangement of the guides 14, 15 on the one hand and the pinions 20, 21 and 38, 39 on the other can be embodied so that each pinion engages with one segment, e.g. in the guide 14 of the advance, and with another segment, e.g. situated approximately diametrically opposite the former, in the guide 15 of the return; with regard to the pinions 38, 39, the same can also occur in the region of the upper arc track 46 and lower arc track 47.

In the exemplary embodiment shown, the pinions 20, 21 are situated beneath the lower guide tracks 45, 56 and beneath the lower arc track 47 adjoining them; the pinions 20, 21 and 38, 39 respectively engage in the region beneath the plate 33 of the carrying element 27. In another exemplary embodiment that is not shown, the pinions 20, 21 and 38, 39 are situated between the upper guide track 44, 55 and the lower guide track 45, 56 and in the region of the arc guides 22, 23 between the upper arc track 46 and lower arc track 47. In another exemplary embodiment that is not shown, in lieu of this, the pinions 20, 21 and 38, 39 are situated above the upper guide track 44, 55 and upper arc track 46, which is likewise advantageously possible.

An extremely wide variety of guidance systems are suitable for forming the guides 14, 15 and arc guides 22, 23, all of which lie within the scope of the invention. Thus, for example, a guide rail can be provided, which, in the region of the guides 14, 15, supports both the upper guide track 44, 55 and the lower guide track 45, 56. For example, this can be a guide rail that is polygonal, or quadrilateral, or rectangular in cross section and is oriented edgewise and, at the upper edge, has inner and/or outer rails to form the upper guide track 44, 55 and in the lower edge region, has corresponding inner and/or outer rails to form the lower guide track 45, 56. In lieu of a single guide rail of this kind, it is also possible for an upper guide rail 64, 75 that supports the upper guide tracks 44, 55 and a lower guide rail 65, 76 that supports the lower guide tracks 45, 56 to be provided; here, too, these guide tracks can be provided inside and/or outside these upper and lower guide rails 64, 65, 75, 76. The arc guides 22, 23 are then correspondingly adapted to them.

If one guide rail is provided, then it supports both the upper arc track 46 and the lower arc track 47, which can be provided outside or inside this arc rail. If instead, two guide rails are provided, then an upper arc rail 66 and a lower arc rail 67 are also respectively provided in the region of the arc guide 22, 23, with the upper arc rail 66 supporting the upper arc track 46 on the outside and/or inside and the lower arc rail 67 supporting the lower arc track 47 on the outside and/or inside. Naturally, the upper guide track 44, 55 can also be implemented in the form of two guide rails extending parallel to each other, as is also true of the lower guide track 45, 56, the upper arc track 46, and the lower arc track 47. The cross section of the above-describe guide rails and arc rails can be not only polygonal, e.g. quadrilateral, but can instead also be curved, e.g. circular, oval, or the like. In this case, the respective guide rails and/or arc rails have outer and/or inner guide tracks for embodying the guide tracks 44, 55; 45, 56; and 46, 47.

In association with the guide tracks 44, 55; 45, 56; and 46, 47, the carrying elements 27 have upper guide elements 57, 58 and lower guide elements 59, 60 that can be embodied, for example, as sliding bodies, e.g. sliding pins, or as shown in the drawings, as rolling bodies, in particular rollers. The guide elements 57 through 60 have pins 61, 62, e.g. bearing shafts or spindles, that extend vertically through the respective carrying element 27 and can protrude from the top and bottom of it. The arrangement is in particular embodied so that each carrying element 27 has two upper guide elements 57, 58 and two lower guide elements 59, 60 that are spaced longitudinally apart from each other on each side.

The two upper guide elements 57, 58 engage the upper guide tracks 44, 55 and upper arc track 46 and the lower guide elements 59, 60 engage the lower guide track 45, 56 and lower arc track 47 and are guided along them; the guidance also occurs in the region of the arc guide 22, 23 without any abrupt direction changes and in a zero-impact fashion. The curves, in particular of the upper arc track 46 and lower arc track 47, as well as their connections to the guide tracks 44, 55 and 45, 56, are embodied so that the container carriers 11 are deflected without jerkiness.

In the exemplary embodiment in which the upper guide track 44, 55 and lower guide track 45, 56 are embodied in the form of a single guide rail or in the form of an upper guide rail 64 and lower guide rail 65, the guide elements 57 through 60 can be embodied in the form of rollers, e.g. guided on two opposite outer surfaces of the guide rails and/or arc rails. With a particular embodiment of the guide elements 57 through 60 in the form of rollers, these can also perform the task of vertically supporting the container carriers 11 and be embodied for this vertical support. This also applies to the kind of exemplary embodiment in which the upper guide track 44, 55 and/or lower guide track 45, 56 are respectively embodied on two longitudinal rails extending approximately parallel to each other, either on their outside or on their inside.

The same is also possible for the embodiment of the arc guide 22, 23. In this case, the upper arc track 46 and/or lower arc track 47 are respectively embodied on two arc rails extending approximately parallel to each other, on the inside or outside of them or also between them. With this embodiment, the respective guide rails and/or arc rails have outer and/or inner guide tracks for the guide elements 57 through 60.

In the exemplary embodiment shown, in order to simplify the drawings, one guide rail with a U-shaped profile is shown for implementing the guide tracks 44, 55; 45, 56 and the arc tracks 46, 47. Thus the upper guide tracks 44 and 55 are each provided on a respective upper guide rail 64 and 75, both of which have a U-shaped profile. Each of the respective lower guide track 45, 56 is implemented in the same way by means of respective lower guide rails 65 and 76 that likewise have U-shaped profiles, with the openings of their U-shapes oriented toward each other. In the same way, the upper arc track 46 is provided on an upper arc rail 66 and the lower arc track 47 is provided on a lower arc rail 67.

These arc rails 66, 67 also have a U-shaped profile that adjoins the respective U-shaped profile of the longitudinally extending guide rails 64, 75 and 65, 76 in the transport direction of the container carriers 11. As is particularly clear from FIG. 1 and FIGS. 4 and 5, the arc guides 22, 23 are embodied on separate components that are interchangeably placed against the longitudinal guides 14, 15 and attached to them. These arc guide components can be quickly and easily installed and removed by means of corresponding fasteners. Easily graspable knurled screws or the like are indicated for the fasteners merely by way of example.

The longitudinally extending upper guide rails 64, 75 and lower guide rails 65, 76 have a U-shaped profile whose width and depth are constant over their longitudinal span. The upper arc rail 66 and lower arc rail 67 are rotated by 180° in relation to each other so that the openings of the U-shaped profiles of the two arc rails 66, 67 are oriented toward each other, as is also true in the longitudinally extending guide rails 64, 75 and 65, 76. However, in the region of the entry and exit, the arc guides 22, 23 are provided with swerve tracks that expand the width of the U and permit a zero-impact deflection of the individual container carriers 11 in the region of the arc guides 22, 23. When the carrying elements 27 travel through the arc guide 22, 23, this results in an inclined position of the carrying elements 27 and therefore of their guide elements 57 through 60. Despite this inclined position, the carrying elements 27 are still able to roll smoothly along the respective arc guides 22, 23 by means of the guide elements 57 through 60.

In particular, in the lower arc rail 67, an inner swerve track 68 is provided at the entry into the arc track 47 and an outer swerve track 69 is provided at the exit from the lower arc track 47. In the upper arc rail 66, these relationships are reversed so that an upper, outer swerve track 70 is provided at the entry and an upper, inner swerve track 71 is provided at the exit. Because of these swerve tracks 68 through 71, in the region of the two arc guides 22, 23 at the entry and exit, there are expansions of the U-shaped profile as well as different profile depths. The lower arc track 47 has a guide track 77 extending at the very bottom of the profile depth, has an approximately uniform profile width, and above this, on the inside and on an outside diametrically opposed to this, has the lower swerve track 68, 69 (FIG. 10), of which the inner swerve track 68 is oriented inward and the outer swerve track 69 is oriented outward. The swerve tracks 68, 69 have a lower depth than the guide track 77 extending at the very bottom.

The upper arc track 46 is embodied in the same way. It has a guide track 78 with an approximately uniform profile width extending at the very top of the profile depth and below this, on an outside and on an inside diametrically opposed to this, has the upper swerve tracks 70, 71, of which the one swerve track 70 is directed outward, transverse to the guide track 78 and the other swerve track 71 is directed inward. Inspection of the lower guide track 77 clearly reveals that the shallower swerve tracks 68, 69 at the entry and exit each transition into the lower arc track 46 in the guide track 77. In the same way, in the upper arc track 47, the swerve tracks 70, 71 transition into the guide track 78.

In adapting to this embodiment of the guide tracks 77, 78 with swerve tracks 68 through 71, the arrangement of the guide elements 57 through 60 on each carrying element 27 is conceived so that an upper guide element 58 protrudes farther upward than the other upper guide element 57 and the associated lower guide element 60 protrudes downward less than the other lower guide element 59. As the carrying elements 27 travel around, the two farther-protruding guide elements 58, 59 are guided in the upper guide rails 64, 75 and lower guide rails 65, 76 of the longitudinally extending guides 14, 15, and in the region of the arc guides 22, 23, travel into the more deeply recessed guide track 77, 78 and travel along it, producing the restricted guidance of the carrying elements 27 along the respective arc guide 22, 23.

The respective swerve tracks 68 through 71 are provided for the guide elements 57, 60 that protrude less from the carrying element 27 and when the respective carrying element 27 is deflected in the region of the arc guides 22, 23, these lesser-protruding guide elements 57, 60 take a different track than the farther-protruding guide elements 58, 59. This track is higher in the region of the lower arc track 47, as evidenced by the shallower swerve tracks 68, 69.

The relationships are the same in the region of the upper arc track 46. It is clear that as the carrying elements 27 travel around, the farther-protruding guide elements 58, 59 are forced to travel in the guide tracks 77, 78, which predetermines the arc guidance. While the deflection is occurring, the other region with the less-protruding guide elements 57, 60 describes a path curvature that corresponds to the completion of the deflection process. So that the guide tracks 77, 78 do not intersect at the completion of the deflection process, the lower guide track 77 is more deeply recessed than the wider, compensation track predetermined by the lower swerve tracks 68, 69. The relationships are analogous in the region of the upper arc track 46. In this case, the upper guide track 78 is more deeply recessed than the region of the swerve tracks 70, 71, which is larger in terms of profile width. Consequently, as the individual carrying elements 27 travel around, as they travel through the arc track 46, 47, a lower guide element 59 in the region of the lower arc track 47 is guided along its guide track 77 that extends along the very bottom and the other lower guide element 60 is guided along the guide track 77 and, at the entry and exit, is guided along the lower swerve tracks 68, 69. In analogous fashion, an upper guide element 58, as it travels through the upper arc track 46, is guided along its guide track 78 that extends along the very top and the other upper guide element 57 is guided along the guide track 78 and, in the region of the entry and exit, is guided along the upper swerve tracks 70, 71.

In order to drive the individual carrying elements 27 along the guides 14, 15 and the arc guides 22, 23, the container carriers 11, in particular their carrying elements 27, are provided with catch elements 40, e.g. in the form of cylindrical pins, that are arranged in a uniformly spaced sequence in the longitudinal direction and are engaged by the pinions 20, 21 and 38, 39. In lieu of these catch elements 40, which constitute a drive level gearing, it is also possible for other similarly functioning elements to be provided on the individual container carriers 11 as long as they fulfill the requirement of being able to engage with the pinions 20, 21 and 38, 39.

The apparatus 10 has a variety of advantages. It is simply designed and, due to its construction, is quick and easy to install and remove. It enables a continuous transport of a wide variety of containers. In order to adapt to different types of containers, the container carriers 11 can have a separate, upper strip at the top in which the recesses 13 are provided; such an upper strip can be quickly and easily replaced in order to adapt to various containers. The drive for transporting the container carriers 11 by means of pinions 20, 21 and 38, 39 and catch elements 40 allows for good accessibility and above all, a favorable, quick, and easy cleaning.

The container carriers 11 can be easily detached and replaced. The carrying elements 27 can be quickly and easily removed from the guides 14, and arc guides 22, 23 for purposes of cleaning, sterilization, or the like. This can, for example, occur through quick and easy removal of individual elements of the guides or also of the turnaround devices 18, 19. If the pinions 20, 21 and 38, 39 are arranged in the above-described fashion underneath the lower guide tracks 45, 56 and the lower arc track 47, then this has the advantage that individual components can be easily removed in a simple fashion and these components can be moved to another place, cleaned, or otherwise handled. The remaining components of the apparatus 10 are also very easily accessible and, for example, easy to clean.

It will be understood that each of the elements described above, or two or more together, may also find a useful application in other types of constructions differing from the type described above.

While the invention has been illustrated and described as embodied in an apparatus for transporting containers to at least one processing station, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. An apparatus for transporting containers to at least one processing station, comprising a plurality of container carriers configured to accommodate the containers; two parallel guides spaced apart from each other and extending in a transverse direction for an advance and return of the container carriers; turnaround devices provided at ends of said parallel guides for switching said container carriers from one of said parallel guides to the other of said parallel guides; pinions for transporting the container carriers, said pinions being situated between said parallel guides and engaging said container carriers, said turnaround devices each having arc guides that adjoin said two parallel guides and transition into an arch from one of said parallel guides to the other of said parallel guides, wherein each of said parallel guides have an upper guide track, and spaced vertically apart from the latter and beneath it, a lower guide track extending parallel to said upper guide track, and wherein carrying elements hold said container carriers between said upper guide track and said lower guide track during transport.

2. An apparatus as defined in claim 1, wherein said container carriers on a rear side oriented toward a respective one of said parallel guides detachably connected to carrying elements.

3. An apparatus as defined in claim 1, wherein two of said upper guide tracks are adjoined by an upper arc track and two of said lower guide tracks are adjoined by a lower arc track, each extending around a 180° circumference angle and configured for a 180° arc guidance of a part of a respective one of said carrying elements, which part engages said upper guide track and said lower guide track.

4. An apparatus as defined in claim 3, wherein at least one of said upper arc track, upper guide track, and both has an upper, substantially horizontal support surface which is configured to support said container carriers in a vertical direction or which is spaced apart from said container carriers in a vertical direction.

5. An apparatus as defined in claim 3, wherein said upper and lower arc tracks are each configured at least approximately in form of segment of a circle, and center points of the circles are substantially aligned with each other in a vertical direction.

6. An apparatus as defined in claim 3, wherein said pinions are situated in a position selected from the group consisting of underneath said lower guide tracks and said lower arc tracks adjoining them, between said upper and lower guide tracks and said arc tracks, and above said upper guide tracks.

7. An apparatus as defined in claim 1, wherein each of said pinions engages with a segment in one of said parallel guides of an advance and with another segment in another of said parallel guides of a return.

8. An apparatus as defined in claim 1, wherein each of said pinions engages with a segment in one of said parallel guides of an advance and with another diametrically opposed segment in another of said parallel guides of a return.

9. An apparatus as defined in claim 1, further comprising a plurality of said pinions situated along a respective one of said guides.

10. An apparatus as defined in claim 9, wherein said pinions situated along a respective one of said guides are configured as gears.

11. An apparatus as defined in claim 3, wherein a respective one of said pinions is situated in a region of said arc track at each end.

12. An apparatus as defined in claim 11, wherein a respective one of said pinions has a rotation axis which is at least substantially aligned vertically with centers of circles of said upper and lower arc tracks.

13. An apparatus as defined in claim 3, wherein said lower arc track has a guide track which is situated at a very bottom in terms of a profile depth and has a substantially uniform profile, and above this, on an inside and a diametrically opposed outside, has respective lower swerve tracks, one of said lower swerve tracks being directed inward transversely to said guide track and the other of said lower serve tracks being directed outwards.

14. An apparatus as defined in claim 3, wherein said upper arc track has a guide track which is situated at a very top in terms of a profile depth and has a substantially uniform profile width, and below this on an outside and on a diametrically opposed inside has respective upper swerve tracks, one of said upper swerve tracks being directed outwards transversely to said guide track and another of said upper swerve tracks being directed inwardly.

15. An apparatus as defined in claims 13 or 14, wherein a respective one of said swerve tracks transitions into said guide track.

16. An apparatus as defined in claim 3, wherein said carrying elements have upper and lower guide elements that respectively engage with and are guided along said upper guide tracks and said upper arc tracks and along said lower guide tracks and said lower arc tracks.

17. An apparatus as defined in claim 16, wherein each of said carrying elements has two said upper guide elements and two said lower guide elements that are spaced apart from each other in a longitudinal direction on each side.

18. An apparatus as defined in claim 13, wherein when traveling through said arc track, a lower guide element in a region of said lower arc track is guided along said guide track extending along a very bottom and another lower guide element is guided along said guide track and said lower swerved tracks.

19. An apparatus as defined in claim 11, wherein when traveling through said arc track, an upper guide element in a region of said upper arc track is guided along said guide track extending along a very top and another upper guide element is guided along said guide track and said upper swerve tracks.

20. An apparatus as defined in claim 17, wherein said guide elements are configured as sliding bodies.

21. An apparatus as defined in claim 20, wherein said guide elements are configured as the sliding bodies in form of sliding pins.

22. An apparatus as defined in claim 17, wherein said guide elements are configured as rolling bodies.

23. An apparatus as defined in claim 22, wherein said guide elements are configured as the rolling bodies in form of rollers.

24. An apparatus as defined in claim 17, wherein said guide elements have pins that extend vertically through a respective one of said carrying elements and protrudes from a top and a bottom of it.

25. An apparatus as defined in claim 24, wherein said pins are configured as parts selected from the group consisting of bearing shafts and spindles.

26. An apparatus as defined in claim 17, wherein in each of said carrying elements, one of said upper guide elements protrudes farther upwards than the other of said upper guide elements and one of said lower guide elements protrudes farther downwards than the other of said lower guide elements.

27. An apparatus as defined in claim 1, wherein said container carriers have catch elements that are arranged in a uniformly spaced sequence in a longitudinal direction and are engaged by said pinions.

28. An apparatus as defined in claim 27, wherein said container carriers have carrying elements provided with said catch elements configured as cylindrical pins and arranged in the uniformly spaced sequence in the longitudinal direction and engaged by said pinions.

29. An apparatus as defined in claim 2, wherein each of said container carriers has an attaching means on a rear side, cooperating with an associated attaching means of said carrier element for producing a detachable connection.

30. An apparatus as defined in claim 29, wherein said attaching means of each of said container carriers and associated one of each of said carrying elements include tongues and also grooves for insertion and accommodation of said tongues.

31. An apparatus as defined in claim 29, further comprising means for a vertically acting slide connection between each of said container carriers and an associated one of said carrying elements.

32. An apparatus as defined in claim 3, wherein a lower part that supports catch elements is composed of a plate that is held spaced apart from and beneath an upper element part of a respective one of said carrying elements, leaving an intermediate space therebetween, in which a respective one of said lower guide tracks and said lower arc tracks extend.

33. An apparatus as defined in claim 32, further comprising at least one column connecting said plate to said upper element part.

34. An apparatus as defined in claim 32, further comprising two columns which are spaced apart from each other and connect said plate to said upper element part.

35. An apparatus as defined in claim 1, wherein each of said container carriers has an upper strip at a top, which is provided with recesses that are open toward a side for regions of containers that are to be accommodated.

36. An apparatus as defined in claim 1, wherein said upper and lower guide tracks of each side are configured on an element selected from the group consisting of a guide rail that supports both said guide tracks and a respective upper and lower guide rails.

37. An apparatus as defined in claim 3, wherein said upper and lower arc tracks are configured on an element selected from the group consisting of an arc rail that supports both said arc tracks and a respective upper and lower arc rails.

38. An apparatus as defined in claims 37, wherein respective ones of elements selected from the group consisting of guide rails, arc rails, and both have guide tracks selected from the group consisting of outer guide tracks, inner guide tracks, and both for guide elements.

39. An apparatus as defined in claim 36, wherein a respective ones of said elements selected from the group consisting of said guide rails, said arc rails, and both are configured with a cross-section that is polygonal.

40. An apparatus as defined in claim 39, wherein said cross-section is a cross-section selected from the group consisting of a quadrilateral cross-section, a curved cross-section and a circular cross-section.

41. An apparatus as defined in claim 18, wherein said guide elements are configured as two rollers that are guided on two opposite outer surfaces of the elements selected from the group consisting of guide rails, arc rails, and both.

42. An apparatus as defined in claim 41, wherein said rollers are configured to vertically support said container carriers.

43. An apparatus as defined in claim 1, wherein said upper and lower guide tracks are respectfully configured on two longitudinal rails extending substantially parallel to each other.

44. An apparatus as defined in claim 3, wherein said arc tracks selected from the group consisting of said upper arc tracks, said lower arc tracks, and both are respectfully configured on two arc rails extending substantially parallel to each other.

45. An apparatus as defined in claim 36, wherein said upper and lower guide rails each have a U-shaped profile and two of said guide rails are oriented with an open end of their U-shapes facing each other.

46. An apparatus as defined in claim 45, wherein each of said arc rails has an open U-shaped profile that adjoins a respective longitudinally extending U-shaped profile of a respective one of said guide rails in a transport direction of said container carriers.

47. An apparatus as defined in claim 46, wherein said arc rails have an upper arc rail and a lower arc rail that are rotated by 180° in relation to each other so that open ends of the U-shaped profiles of said arc rails are oriented toward each other, and in said lower arc rail an inner swerve track is provided at an entry into said arc track and an outer swerve track is provided at an exit from said arc track, whereas in said upper arc rail it is reversed so that said outer swerve track is provided at an entry into said arc track and said inner swerve track is provided at an exit from said arc track.

48. An apparatus for transporting containers to at least one processing station, comprising a plurality of container carriers configured to accommodate the containers; two parallel guides spaced apart from each other and extending in a transverse direction for an advance and return of the container carriers; turnaround devices provided at ends of said parallel guides for switching said container carriers from one of said parallel guides to the other of said parallel guides; pinions for transporting the container carriers, said pinions being situated between said parallel guides and engaging said container carriers, said turnaround devices each having arc guides that adjoin said two parallel guides and transition into an arch from one of said parallel guides to the other of said parallel guides, wherein two of said upper guide tracks are adjoined by an upper arc track and two of said lower guide tracks are adjoined by a lower arc track, each extending around a 180° circumference angle and configured for a 180° arc guidance of a part of a respective one of said carrying elements, which part engages said upper guide track and said lower guide track.

49. An apparatus for transporting containers to at least one processing station, comprising a plurality of container carriers configured to accommodate the containers; two parallel guides spaced apart from each other and extending in a transverse direction for an advance and return of the container carriers; turnaround devices provided at ends of said parallel guides for switching said container carriers from one of said parallel guides to the other of said parallel guides; pinions for transporting the container carriers, said pinions being situated between said parallel guides and engaging said container carriers, said turnaround device each having arc guides that adjoin said two parallel guides and transition into an arch from one of said parallel guides to the other of said parallel guides, wherein said pinions are situated in a position selected from the group consisting of underneath said lower guide tracks and said lower arc tracks adjoining them, between said upper and lower guide tracks and said arc tracks, and above said upper guide tracks.

* * * * *